(12) United States Patent
Mei et al.

(10) Patent No.: US 9,898,005 B2
(45) Date of Patent: Feb. 20, 2018

(54) DRIVING PATH DETERMINATION FOR AUTONOMOUS VEHICLES

(71) Applicant: Toyota Motor Engineering & Manufacturing North America, Inc., Erlander, KY (US)

(72) Inventors: Xue Mei, Ann Arbor, MI (US); Masahiro Harada, Novi, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/192,032

(22) Filed: Jun. 24, 2016

(65) Prior Publication Data

US 2017/0371336 A1    Dec. 28, 2017

(51) Int. Cl.
*G05D 1/02* (2006.01)
*G05D 1/00* (2006.01)

(52) U.S. Cl.
CPC ......... *G05D 1/0088* (2013.01); *G05D 1/0212* (2013.01); *G05D 1/0255* (2013.01); *G05D 1/0257* (2013.01); *G05D 2201/0213* (2013.01)

(58) Field of Classification Search
CPC .. G05D 1/0088; G05D 1/0212; G05D 1/0255; G05D 1/0257; G05D 2201/0213
USPC .......................................................... 701/25
See application file for complete search history.

(56) References Cited

U.S. PATENT DOCUMENTS

| | | | |
|---|---|---|---|
| 9,008,890 B1 * | 4/2015 | Herbach | B60W 30/00 340/435 |
| 9,120,485 B1 | 9/2015 | Dolgov | |
| 9,373,149 B2 * | 6/2016 | Abhyanker | G06Q 50/28 |
| 9,690,293 B2 * | 6/2017 | Shashua | G05D 1/0088 |
| 9,760,090 B2 * | 9/2017 | Shashua | G05D 1/0088 |
| 2007/0291130 A1 * | 12/2007 | Broggi | G01S 17/023 348/218.1 |
| 2009/0295917 A1 | 12/2009 | Zhang et al. | |
| 2010/0106356 A1 * | 4/2010 | Trepagnier | G01S 17/023 701/25 |
| 2013/0211720 A1 | 8/2013 | Niemz | |

(Continued)

FOREIGN PATENT DOCUMENTS

JP    2014142831 A    8/2014
JP    2014184747 A    10/2014

OTHER PUBLICATIONS

Ordonez et al., "Laser-Based Rut Detection and Following System for Autonomous Ground Vehicles", Florida A&M—Florida State University, 22 pages.

*Primary Examiner* — Atul Trivedi

(74) *Attorney, Agent, or Firm* — Christopher G. Darrow; Darrow Mustafa PC

(57) ABSTRACT

A method of autonomous driving includes identifying, from detected information about an environment surrounding a vehicle on a roadway, a lateral surface profile of the roadway. Based on the lateral surface profile of the roadway, vertical wheel positions at identified candidate future lateral positions of the vehicle are determined. Based on the determined vertical wheel positions, as part of a driving path along the roadway, future lateral positions of the vehicle from among the identified candidates therefor are determined using an energy function that algorithmically favors low vertical wheel positions.

20 Claims, 4 Drawing Sheets

(56) References Cited

U.S. PATENT DOCUMENTS

| | | | | |
|---|---|---|---|---|
| 2015/0202770 A1* | 7/2015 | Patron | .................... | G05D 1/024 |
| | | | | 700/245 |
| 2015/0345966 A1* | 12/2015 | Meuleau | ............ | G01C 21/3453 |
| | | | | 701/23 |
| 2016/0132705 A1* | 5/2016 | Kovarik | ............. | G06K 7/10376 |
| | | | | 340/10.3 |
| 2016/0318531 A1* | 11/2016 | Johnson | .................. | B61L 25/02 |
| 2017/0010106 A1* | 1/2017 | Shashua | ................ | G01C 21/32 |
| 2017/0123434 A1* | 5/2017 | Urano | .................... | B60Q 9/008 |

\* cited by examiner

DRIVING PATH DETERMINATION FOR AUTONOMOUS VEHICLES

TECHNICAL FIELD

The embodiments disclosed herein generally relate to autonomous operation systems for vehicles, and more particularly to their generation and execution of driving plans for maneuvering vehicles on roadways.

BACKGROUND

Some vehicles include an autonomous operation system under which the vehicle is subject to autonomous operation. In these so-called autonomous vehicles, a human driver may cede control over one or more primary control functions in favor of autonomous operation. In autonomous operation, the autonomous operation system generates a driving plan for maneuvering the vehicle on a roadway based on detected information about the environment surrounding the vehicle. To execute the driving plan, the autonomous operation system operates vehicle systems associated with the primary control functions over which the human driver has ceded control.

A driving plan may describe, among other things, a driving path of the vehicle along a roadway. An autonomous operation system's framework for determining the driving path has to accommodate the dynamic changes in the environment surrounding the vehicle involved in real world situations. Developing and improving these frameworks is the subject of ongoing research.

SUMMARY

Disclosed herein are embodiments of methods of autonomous driving and vehicles with components of autonomous operation systems. These embodiments involve the determination of driving paths along roadways. This determination is suited for roadways on which ruts, such as snow ruts, are formed.

In one aspect, a method of autonomous driving includes identifying, using a perception module executable by at least one processor, from detected information about an environment surrounding a vehicle on a roadway, a lateral surface profile of the roadway. Based on the lateral surface profile of the roadway, vertical wheel positions at identified candidate future lateral positions of the vehicle are determined using a planning/decision making module executable by the at least one processor. Based on the determined vertical wheel positions, once again using the planning/decision making module executable by the at least one processor, as part of a driving path along the roadway, future lateral positions of the vehicle from among the identified candidates therefor are determined using an energy function that algorithmically favors low vertical wheel positions.

In another aspect, a vehicle includes sensors configured to detect information about an environment surrounding the vehicle, and vehicle systems operable to maneuver the vehicle. The vehicle also includes one or more modules stored on memory and executable by at least one processor for initiating instructions. The instructions include identifying, from the detected information about the environment surrounding the vehicle, a lateral surface profile of the roadway. Based on the lateral surface profile of the roadway, vertical wheel positions at identified candidate future lateral positions of the vehicle are determined. Based on the determined vertical wheel positions, as part of a driving path along the roadway, future lateral positions of the vehicle from among the identified candidates therefor are determined using an energy function that algorithmically favors low vertical wheel positions. The vehicle systems are then operated to maneuver the vehicle along the roadway according to a driving plan describing the driving path.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle with an autonomous operation system configured to generate and execute a driving plan for maneuvering the vehicle on a roadway. A driving path of the vehicle along a roadway described in the driving plan is determined using an energy function that algorithmically favors, among other things, low vertical wheel positions. This determination is, by this, suited for roadways on which ruts, such as snow ruts, are formed.

Figure 1:
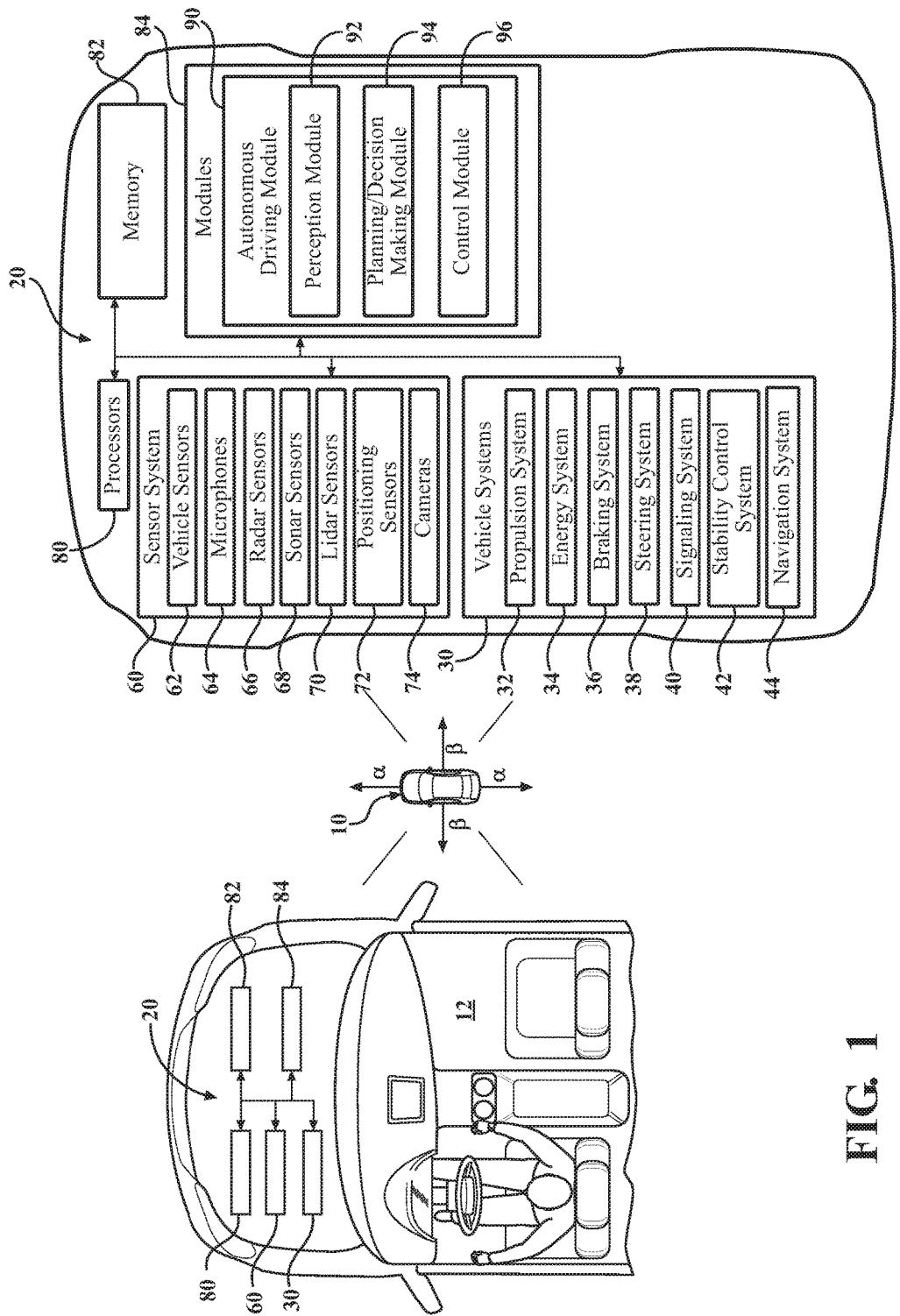
FIG. 1 includes top views of a vehicle, showing, via block diagrams, components of an autonomous operation system.
Figure 2:
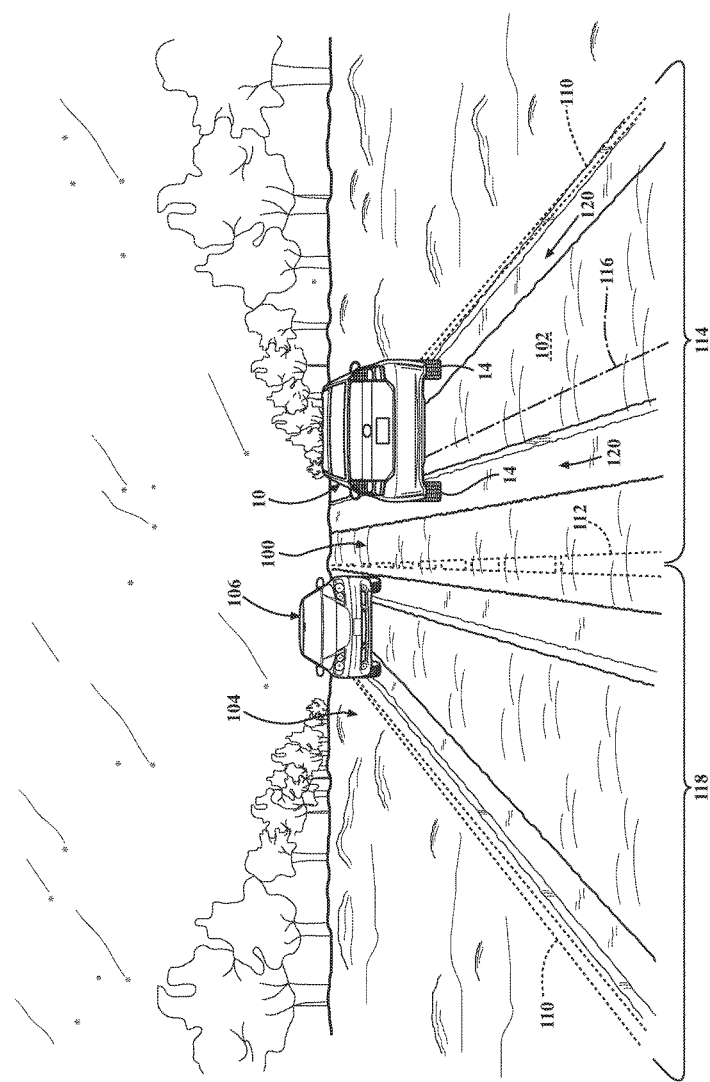
FIG. 2 is a perspective view of the vehicle and an example environment surrounding the vehicle detectable by the autonomous operation system while the vehicle is on a roadway covered in snow, showing the roadway, snow ruts on the roadway and example obstacles on the roadway.

A representative vehicle 10 is shown in FIGS. 1 and 2. The vehicle 10 has an exterior and a number of inner compartments. The inner compartments may include a passenger compartment 12, an engine compartment and, for the illustrated vehicle 10, a trunk.

The vehicle 10 may include, among other things, an engine, motor, transmission and other powertrain components housed in its engine compartment or elsewhere in the vehicle 10, as well as other powertrain components, such as wheels 14. The wheels 14 support the remainder of the vehicle 10. One, some or all of the wheels 14 may be powered by other powertrain components to drive the vehicle 10. One, some or all of the wheels 14 may be steered wheels subject to having their steering angles adjusted to adjust the orientation of the vehicle 10.

The vehicle 10 includes an autonomous operation system 20 under which the vehicle 10 is, generally speaking, subject to autonomous operation. Under the autonomous operation system, the vehicle 10 may be semi-autonomous or highly automated, for instance.

The autonomous operation system 20 includes various autonomous support systems that support autonomous operation of the vehicle 10. Although the autonomous support systems could be dedicated to the autonomous operation system 20, it is contemplated that some or all of the autonomous support systems may also support other functions of the vehicle 10, including its manual operation.

The autonomous support systems may be or include various vehicle systems 30. The vehicle systems 30 may include a propulsion system 32, an energy system 34, a braking system 36, a steering system 38, a signaling system 40, a stability control system 42 and a navigation system 44, for example, as well as any other systems generally available in vehicles.

The propulsion system 32 includes components operable to accelerate the vehicle 10, as well as maintain its speed. The propulsion system 32 may include, for instance, the engine, motor, transmission and other powertrain components, as well as certain vehicle controls, such as a cruise control system. The energy system 34 includes components that control or otherwise support the storage and use of energy by the vehicle 10. The energy source employed by the energy system 34 may include, for instance, gasoline, natural gas, diesel oil and the like, as well as batteries, fuel cells and the like.

The braking system 36 includes components operable to decelerate the vehicle 10, such as brakes, for instance. The steering system 38 includes components operable to adjust the orientation of the vehicle 10 with respect to its longitudinal direction $\alpha$ or lateral direction $\beta$, or both, by, for example, adjusting the steering angle of one, some or all of the wheels 14. The signaling system 40 includes components operable to communicate driving intentions and other notifications to other vehicles and their users. The signaling system 40 may include, for instance, exterior lights such as headlights, a left turn indicator light, a right turn indicator light, a brake indicator light, a backup indicator light, taillights and a running light. The stability control system 42 includes components operable to maintain, among other aspects of the stability of the vehicle 10, its proper yaw and pitch, by, for example, actuating brakes and adjusting the power to one, some or all of the wheels 14 powered by other powertrain components to drive the vehicle 10.

The navigation system 44 establishes routes and directions for the vehicle 10 using, for instance, digital maps. The navigation system 44 may itself include digital maps, or the navigation system 44 may connect to remote sources for digital maps. In the absence of the navigation system 44, the autonomous operation system 20 may connect to remote sources for routes and directions for the vehicle 10.

In addition to the vehicle systems 30, the autonomous support systems may be or include a sensor system 60 including one or more sensors. The sensor system 60 and its sensors may be positioned anywhere in or on the vehicle 10, and may include existing sensors of the vehicle 10, such as backup sensors, lane keeping sensors and front sensors, for instance. In these and other configurations, the sensor system 60 and its sensors may detect information about the vehicle 10, including without limitation information about the operation of the vehicle 10 and information about the environment surrounding the vehicle 10. In the case of information about the environment surrounding the vehicle 10, the sensor system 60 and its sensors may detect information about the environment in front of and behind the vehicle 10 in its longitudinal direction $\alpha$, as well as to the sides of the vehicle 10 in its lateral direction $\beta$.

The sensor system 60 and its sensors may be configured to monitor in real-time, that is, at a level of processing responsiveness at which sensing is sufficiently immediate for a particular process or determination to be made, or that enables a processor to keep up with some external process.

The sensors of the sensor system 60 may include one or more vehicle sensors 62, one or more microphones 64, one or more radar sensors 66, one or more lidar sensors 68, one or more sonar sensors 70, one or more positioning sensors 72 and one or more cameras 74, for example, as well as any other sensors generally available in vehicles.

The vehicle sensors 62 are operable to detect information about the operation of the vehicle 10. The vehicle sensors 62 may include, for instance, speedometers, gyroscopes, magnetometers, accelerometers, barometers, thermometers, altimeters, inertial measurement units (IMUs) and controller area network (CAN) sensors. In these and other configurations of the vehicle sensors 62, the detected information about the operation of the vehicle 10 may include, for example, its speed, acceleration, orientation, rotation, direction, elevation, temperature and the like, as well as the operational statuses of the vehicle systems 30 and their components.

The microphones 64 are operable detect sounds waves, and transform those sound waves into corresponding signals. Some microphones 64 may be located to detect sound waves in the environment surrounding the vehicle 10. These microphones 64 may, accordingly, be at least partially exposed to the environment surrounding the vehicle 10.

The radar sensors 66, the sonar sensors 68 and the lidar sensors 70 are each mounted on the vehicle 10 and positioned to have a fields of view in the environment surrounding the vehicle 10, and are each, generally speaking, operable to detect objects in the environment surrounding the vehicle 10. More specifically, the radar sensors 66, the sonar sensors 68 and the lidar sensors 70 are each operable to scan the environment surrounding the vehicle 10, using radio signals in the case of the radar sensors 66, sound waves in the case of the sonar sensors 68 and laser signals in the case of the lidar sensors 70, and generate signals representing objects, or the lack thereof, in the environment surrounding the vehicle 10. Among other things about the objects, the signals may represent their presence, location and motion, including their speed, acceleration, orientation, rotation, direction and the like, either absolutely or relative to the vehicle 10, or both.

The signals generated by the lidar sensors 70 include without limitation 3D points. The lidar sensors 70 each include a transmitter and a receiver. The transmitters are operable to transmit eye safe laser signals from any suitable portion of the electromagnetic spectrum, such as from the ultraviolet, visible, or near infrared portions of the electromagnetic spectrum, into the environment surrounding the vehicle 10, where they impinge upon objects located in their paths. The laser signals may be transmitted in series of 360 degree spins around a vertical axis of the vehicle 10, for example. When the laser signals impinge upon objects, portions thereof are returned by reflection to the lidar sensors 70, where they are captured by the receivers. The receivers may be, or include, one or more photodetectors, solid state photodetectors, photodiodes or photomultipliers, or any combination of these.

Responsive to capturing the returned laser signals, the lidar sensors 70 output signals representing objects, or the lack thereof, in the environment surrounding the vehicle 10. The lidar sensors 70 may each include a global positioning system (GPS) transceiver or other positioning sensor for identifying their positions, and an IMU for identifying their pose. According to this configuration, the signals may include 3D points representing the location in space of the points from which the returned laser signals are received, and therefore, the location in space of points of objects on which the laser signals impinged. The lidar sensors 70 may determine the location in space of points of objects based on the distance from the lidar sensors 70 to the points, as well as the position and pose of the lidar sensors 70 associated with the returned laser signals. The distance to the points may be determined from the returned laser signals using the time of flight (TOF) method, for instance. The signals may also represent the locations in space from which no returned laser signals are received, and therefore, the lack of points of objects in those locations in space on which the laser signals would have otherwise impinged.

The signals output by the lidar sensors 70 may further represent other aspects of the returned laser signals, which, in turn, may represent other properties of points of objects on which the incident laser signals impinged. These aspects of the returned laser signals can include their intensity or reflectivity, for instance, or any combination of these.

The positioning sensors 72 are operable to identify the position of the vehicle 10. The positioning sensors 72 may implement, in whole or in part, a GPS, a geolocation system or a local positioning system, for instance, or any combination of these. For implementing a GPS, the positioning sensors 72 may include GPS transceivers configured to determine a position of the vehicle 10 with respect to the Earth via its latitude and longitude and, optionally, its altitude.

The cameras 74 are operable to detect light or other electromagnetic energy from objects, and transform that electromagnetic energy into corresponding visual data signals representing objects, or the lack thereof. The cameras 74 may be, or include, one or more image sensors configured for capturing light or other electromagnetic energy. These image sensors may be, or include, one or more photodetectors, solid state photodetectors, photodiodes or photomultipliers, or any combination of these. In these and other configurations, the cameras 74 may be any suitable type, including without limitation high resolution, high dynamic range (HDR), infrared (IR) or thermal imaging, or any combination of these.

Some cameras 74 may be located to detect electromagnetic energy within the passenger compartment 12 of the vehicle 10. These cameras 74 may accordingly be located within the passenger compartment 12 of the vehicle 10. Other cameras 74 may be located to detect electromagnetic energy in the environment surrounding the vehicle 10. These cameras 74 may be mounted on the vehicle 10 and positioned to have fields of view individually, or collectively, common to those of the radar sensors 66, the sonar sensors 68 and the lidar sensors 70 in the environment surrounding the vehicle 10, for example.

In addition to its autonomous support systems, the autonomous operation system 20 includes one or more processors 80, a memory 82 and one or more modules 84. Together, the processors 80, the memory 82 and the modules 84 constitute a computing device to which the vehicle systems 30, the sensor system 60 and any other autonomous support systems are communicatively connected. Although this computing device could be dedicated to the autonomous operation system 20, it is contemplated that some or all of its processors 80, its memory 82 and its modules 84 could also be configured as parts of a central control system for the vehicle 10, for instance, such as a central electronic control unit (ECU).

The processors 80 may be any components configured to execute any of the processes described herein or any form of instructions to carry out such processes or cause such processes to be performed. The processors 80 may be implemented with one or more general-purpose or special-purpose processors. Examples of suitable processors 80 include microprocessors, microcontrollers, digital signal processors or other forms of circuitry that can execute software. Other examples of suitable processors 80 include without limitation central processing units (CPUs), array processors, vector processors, digital signal processors (DSPs), field-programmable gate arrays (FPGAs), programmable logic arrays (PLAs), application specific integrated circuits (ASICs), programmable logic circuitry or controllers. The processors 80 can include at least one hardware circuit (e.g., an integrated circuit) configured to carry out instructions contained in program code. In arrangements where there are multiple processors 80, the processors 80 can work independently from each other or in combination with one another.

The memory 82 is a non-transitory computer readable medium. The memory 82 may include volatile or non-volatile memory, or both. Examples of suitable memory 82 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives or any other suitable storage medium, or any combination of these. The memory 82 includes stored instructions in program code. Such instructions can be executed by the processors 80 or the modules 84. The memory 82 may be part of the processors 80 or the modules 84, or may be communicatively connected the processors 80 or the modules 84.

The modules 84 are employable to perform various tasks in the vehicle 10. Generally speaking, the modules 84 include instructions that may be executed by the processors 80. The modules 84 can be implemented as computer readable program code that, when executed by the processors 80, execute one or more of the processes described herein. Such {01027219} 8 computer readable program code can be stored on the memory 82. The modules 84 may be part of the processors 80, or may be communicatively connected the processors 80.

The modules 84 may include, for example, an autonomous driving module 90. The autonomous driving module 90 generates driving plans for maneuvering the vehicle 10 on roadways based on the information about the vehicle 10 detected by the sensor system 60 and its sensors, and executes the driving plans by operating the appropriate vehicle systems 30. In this so-called autonomous operation of the vehicle 10, its human driver will have ceded control over one or more primary control functions in favor of autonomous operation. These primary control functions may include propulsion, or throttle, braking or steering, for instance, or any combination of these. The vehicle systems 30 operated by the autonomous driving module 90 include those associated with the primary control functions over which the human driver has ceded control.

Among other sub-modules, the autonomous driving module 90 may include a perception module 92, a planning/decision making module 94 and a control module 96.

The perception module 92 gathers and evaluates information about the vehicle 10 detected by the sensor system 60 and its sensors. In the case of information about the environment surrounding the vehicle 10, the perception module 92 may, as part of its evaluation, identify objects in the environment surrounding the vehicle 10, including their properties. These properties may include, among other things about the objects, their presence, location and motion, including their speed, acceleration, orientation, rotation, direction and the like, either absolutely or relative to the vehicle 10, or both, as well as their reflectivity, surface profile, color, thermal profile and the like.

The perception module 92 may discriminate between different objects and individually track different objects over time. Either on initial detection or after tracking them over time, the perception module 92 may classify the objects to account not only for roadways, features of roadways, such as lane markings, and obstacles on roadways, such as other vehicles, but also for surrounding ground, pedestrians, bicycles, construction equipment, road signs, buildings, trees and foliage, for instance. Either alone or in combination with its identification and classification of objects in the environment surrounding the vehicle 10, the perception module 92 may identify roadway conditions, such as surface profiles of roadways, weather conditions, traffic conditions and the like.

The planning/decision making module 94, based on the evaluation of the information about the vehicle 10 by the perception module 92, generates driving plans for maneuvering the vehicle 10 on roadways. The driving plans may account for any objects in the environment surrounding the vehicle 10, their properties and roadway conditions, for example. The driving plans may also account for different lane positions and traffic rules, such as speed limits, priorities at intersections and roundabouts, stop line positions and the like. The planning/decision making module 94 may itself include digital maps reflecting these lane positions and traffic rules as part of an overall 3D road network, for instance, or the planning/decision making module 94 may connect to the navigation system 44 or to remote sources for digital maps.

The control module 96 operates the appropriate vehicle systems 30 to execute the driving plans generated by the planning/decision making module 94. The control module 96 may send control signals to the vehicle systems 30 or may directly send control signals to actuators that operate their components, or both.

Figure 3:
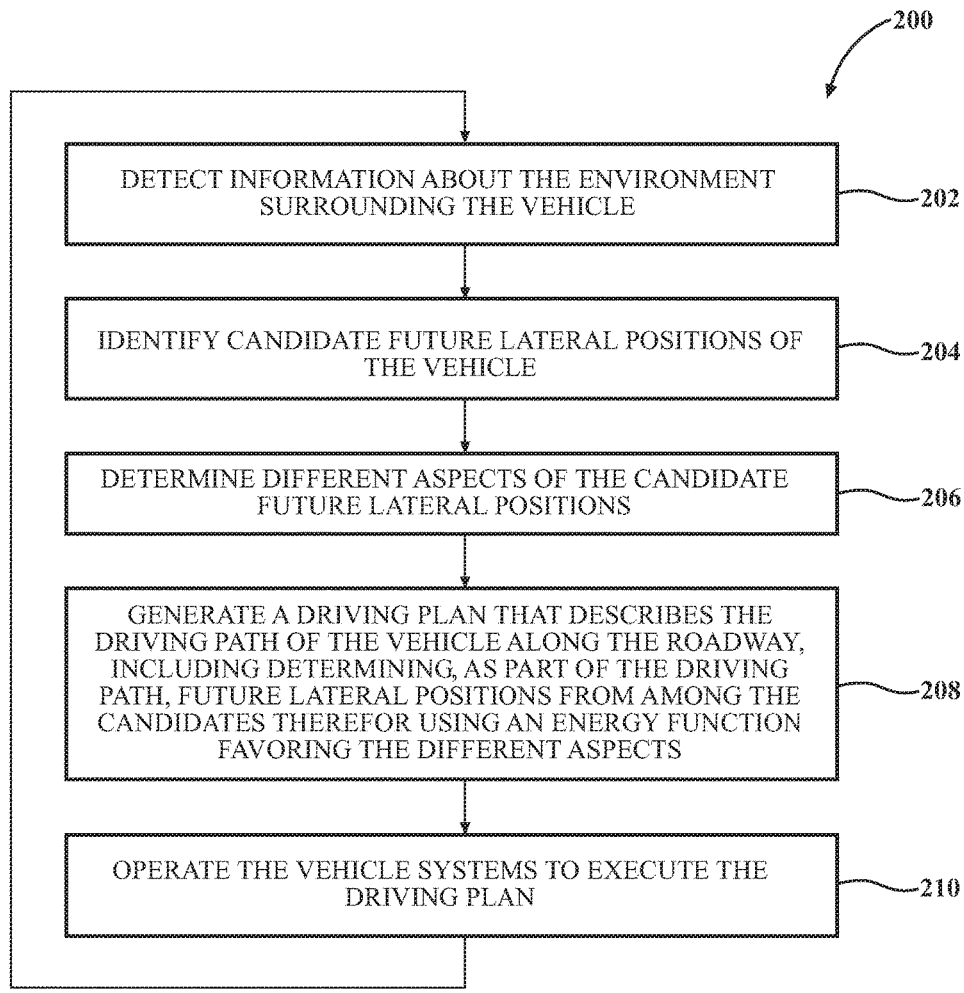
FIG. 3 is a flowchart showing the operations of a process by which the autonomous operation system generates and executes a driving plan for maneuvering the vehicle on the roadway based on the detected information about the environment surrounding the vehicle, including determining, as part of a driving path along the roadway, future lateral positions of the vehicle.

The vehicle 10 is shown, in FIG. 2, on an exemplary longitudinal roadway 100. As generally shown, the roadway 100 is subject to winter weather conditions and, as a result, its surface 102 is covered in snow. The operations of a process 200 by which the autonomous operation system 20 generates and executes a driving plan for maneuvering the vehicle 10 on the roadway 100 are shown in FIG. 3. Although the process 200 is described with reference to the roadway 100 and other roadways whose surfaces are similarly covered in snow, it will be understood that the process 200 is applicable in principle to any roadways on which ruts are formed, including, for instance, roadways on which mud ruts are formed.

In operation 202, information about the vehicle 10 is detected by the sensor system 60 and its sensors for gathering and evaluation by the perception module 92.

In the case of information about the environment surrounding the vehicle 10, the perception module 92 may, as part of its evaluation, identify, among other objects in the environment surrounding the vehicle 10, the roadway 100, the surrounding ground 104, as well as any obstacles on the roadway 100, such as an oncoming neighboring vehicle 106.

In addition to identifying the roadway 100 itself, the perception module 92 may identify its surface 102 and, among other features of the roadway 100, lane markings which, for the illustrated roadway 100, include edge lines 110 and a center line 112. The edge lines 110 mark the outside boundaries of the roadway 100, while the center line 112 separates the roadway 100 into two sections for traffic moving in opposite directions. The perception module 92 may further identify the distinct lanes of the roadway 100, as well as the lane centers of these lanes. For the illustrated roadway 100, these lanes include a lane 114 extending between one edge line 110 and the center line 112, in which the vehicle 10 located, and which has a lane center 116. These lanes further include a lane 118 for traffic moving in the opposite direction as the vehicle 10 extending between the center line 112 and the other edge line 110, in which the neighboring vehicle 106 is located. The perception module 92 may moreover identify various roadway conditions, such as the surface profile of the roadway 100 and that its surface 102 is covered in snow.

In operations 204-208, the planning/decision making module 94, based on the evaluation of the information about the vehicle 10 by the perception module 92, generates a driving plan for maneuvering the vehicle 10 on the roadway 100.

Assuming the usual case of forward progress of the vehicle 10 in the direction of the roadway 100, the driving plan may be for maneuvering the vehicle 10 along the roadway 100 from an origin, such as the current location of the vehicle 10 on the roadway 100, to an ultimate future location of the vehicle 10 on the roadway 100 a certain distance down the roadway 100. As a whole, the driving plan describes the motion of the vehicle 10 along the roadway 100. Part of the driving plan may describe a trajectory, or driving path, of the vehicle 10 along the roadway 100. Other parts the driving plan may describe other things about maneuvering the vehicle 10 along the roadway 100, such as the speed, acceleration and orientation of the vehicle 10 along the roadway 100, as well as its signaling, for instance.

Generally speaking, the driving path may be represented by successive future locations of the vehicle 10 along the roadway 100 from the origin to the ultimate future location of the vehicle 10 on the roadway 100. These successive future locations of the vehicle 10 along the roadway 100 may be defined by successive future positions of the vehicle 10 in the direction of the roadway 100, or future longitudinal positions of the vehicle 10. The successive future locations of the vehicle 10 along the roadway 100 may further be defined by future positions of the vehicle 10 across the direction of the roadway 100, or future lateral positions of the vehicle 10, for each of the future longitudinal positions of the vehicle 10. The driving path may accordingly be represented by pairs of future longitudinal positions of the vehicle 10, and corresponding future lateral positions of the vehicle 10.

The driving path, like other parts of the driving plan, is determined based on the information about the vehicle 10 detected by the sensor system 60 and its sensors and, more specifically, based on the information about the environment surrounding the vehicle 10. In the determination of the driving path, in the case of forward progress of the vehicle 10 in the direction of the roadway 100, the future longitudinal positions of the vehicle 10 may be taken as a given or otherwise determined as a matter of course. There are often, however, many identifiable candidates for the corresponding future lateral positions of the vehicle 10.

With dynamic changes in the environment surrounding the vehicle 10, different aspects of the candidate future lateral positions of the vehicle 10 often compete, align or otherwise interact in different ways. It would be advantageous to expeditiously determine the future lateral positions of the vehicle 10 from among the candidates therefor and, as an extension, the driving path as a whole, using a single framework from which a global optimum driving path is returned that accommodates interacting aspects of the candidate future lateral positions of the vehicle 10.

These advantages may be realized by determining the future lateral positions of the vehicle 10 using the example energy function shown in Equation 1:

$$x = \mathrm{argmin}[\rho P(x) + \lambda Q(x) + \mu R(x) + \eta S(x) + T(x)] \quad \text{(Eq. 1)}$$

In Equation 1, the argument at which the energy function is minimized, x, is a set of the future lateral positions of the vehicle 10 (i.e., $x_i$) for given future longitudinal positions of the vehicle 10.

The energy function includes a number of sub-functions that determine different aspects of the candidate future lateral positions of the vehicle 10. In the context of the energy function, the sub-functions favor certain aspects of the candidate future lateral positions of the vehicle 10. Equally, the sub-functions penalize the inverses of those aspects of the candidate future lateral positions of the vehicle 10. The sub-functions may include, for instance, a vertical wheel position determination function P(x), a driving path lateral curvature determination function Q(x), a lane center lateral offset determination function R(x), an obstacle proximity determination function S(x) and a predetermined driving path deviation determination function T(x).

In operation 204, the planning/decision making module 94 identifies the candidate future lateral positions of the vehicle 10. In other words, for each of the future longitudinal positions of the vehicle 10, multiple corresponding candidate future lateral positions of the vehicle 10 are identified. The candidate future lateral positions of the vehicle 10 may be identified as all of those reasonably possible given the current location and motion of the vehicle 10 on the roadway 100, or as some subset of these, for example.

In operation 206, the planning/decision making module 94 uses the sub-functions to determine different aspects of the candidate future lateral positions of the vehicle 10. The aspects of the candidate future lateral positions of the vehicle 10 are determined based on the information about the vehicle 10 detected by the sensor system 60 and its sensors. The aspects of the candidate future lateral positions of the vehicle 10 are determined, more specifically, based on the information about the environment surrounding the vehicle 10 and, even more specifically, based on the identification, by the perception module 92, of the objects in the environment surrounding the vehicle 10, the features of the roadway 100 and roadway conditions.

The vertical wheel position determination function P(x) determines the vertical positions of the wheels 14 of vehicle 10 at the candidate future lateral positions of the vehicle 10.

Figure 4:
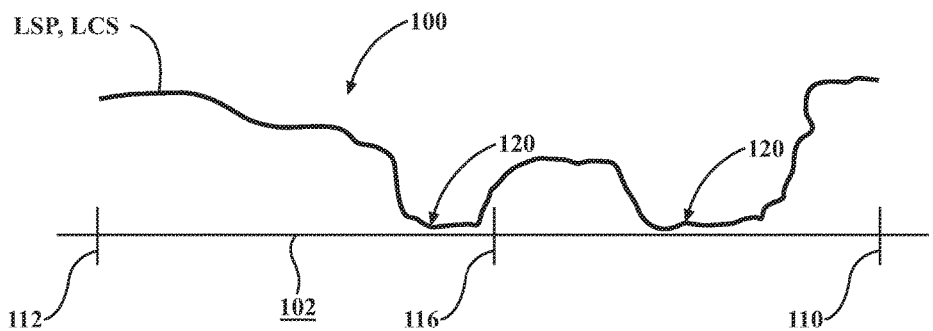
FIGS. 4 and 5 are conceptual renderings of a lateral surface profile of the roadway identifiable from the detected information about the environment surrounding the vehicle, showing their representations of the snow ruts on the roadway and, in FIG. 5, the future lateral positions of the vehicle determined as part of the driving path.

As shown with additional reference to FIG. 4, in support of this determination, the perception module 92 may identify, among other roadway conditions, a surface profile of the roadway 100 across the direction of the roadway 100, or a lateral surface profile LSP of the roadway 100. The lateral surface profile LSP of the roadway 100 is represented by discretized cross sections of the roadway 100 across the direction of the roadway 100, or discretized lateral cross sections LCS of the roadway 100 (i.e., $LCS_i$) at given future longitudinal positions of the vehicle 10.

In one implementation, the perception module 92 may identify the lateral surface profile LSP of the roadway 100, and its discretized lateral cross sections LCS of the roadway 100, from 3D points included among the signals generated by the lidar sensors 70. These 3D points represent the objects in the environment surrounding the vehicle 10 via their representation of the locations in space of points of the objects on which the laser signals of the lidar sensors 70 impinged. The perception module 92 may, for example, identify and remove those of the 3D points representing any objects exhibiting motion, or dynamic objects, in the environment surrounding the vehicle 10, such as the neighboring vehicle 106. The remaining 3D points representing the roadway 100 and its features, as well as the surrounding ground 104, for example, may then be used to identify the lateral surface profile LSP of the roadway 100, and its discretized lateral cross sections LCS of the roadway 100.

For the roadway 100, whose surface 102 is covered in snow, the lateral surface profile LSP of the roadway 100, and its discretized lateral cross sections LCS of the roadway 100, represent, among other things, snow ruts 120 on the roadway 100. As snow falls on the surface 102 of the roadway 100, when proceeding vehicles drive along the roadway 100, their wheels form the snow ruts 120 by pushing the fallen snow to their sides into snow piles, and leaving tracks between the snow piles.

In the context of the energy function, the vertical wheel position determination function P(x) favors low vertical wheel positions by returning lower values for the candidate future lateral positions of the vehicle 10 at which the vertical positions of the wheels 14 of vehicle 10 are lower. Equally, the vertical wheel position determination function P(x) penalizes high vertical wheel positions by returning higher values for the candidate future lateral positions of the vehicle 10 at which the vertical positions of the wheels 14 of vehicle 10 are higher.

With the energy function, in other words, favoring low vertical wheel positions via the vertical wheel position determination function P(x), the energy function is suited for roadways on which ruts are formed. In the case of the roadway 100, for instance, the lowest vertical wheel positions occur for the candidate future lateral positions of the vehicle 10 in which its wheels 14 are positioned on the existing tracks in the snow ruts 120. On the other hand, the highest vertical wheel positions occur for the candidate future lateral positions of the vehicle 10 in which its wheels 14 are positioned on the snow piles bordering the tracks. The energy function accordingly, by favoring low vertical wheel positions, favors the determination of future lateral positions of the vehicle 10 from among the candidates therefor and, as an extension, a driving path as a whole, by which the vehicle 10 follows the existing tracks in the snow ruts 120, and avoids the snow piles bordering the tracks.

An example of the vertical wheel position determination function P(x) is shown in Equation 2:

$$P(x) = \sum_{\{i=1\}}^{K} \|Z(x_i)\|^2 \quad \text{(Eq. 2)}$$

In Equation 2, $Z(x_i)$ is the average height of the wheels 14 of the vehicle 10 above a reference level, which is determined at the candidate future lateral positions of the vehicle 10 for given future longitudinal positions of the vehicle 10, for instance, at the discretized lateral cross sections LCS of the roadway 100.

The driving path lateral curvature determination function Q(x) determines the lateral curvature between the candidate future lateral positions of the vehicle 10.

In the context of the energy function, the driving path lateral curvature determination function Q(x) favors low lateral curvature by returning lower values for the candidate future lateral positions of the vehicle 10 at which the lateral curvature is lower. Equally, the driving path lateral curvature determination function Q(x) penalizes high lateral curvature by returning higher values for the candidate future lateral positions of the vehicle 10 at which the lateral curvature is higher.

With the energy function, in other words, favoring low lateral curvature via the driving path lateral curvature determination function Q(x), the energy function favors the determination of future lateral positions of the vehicle 10 from among the candidates therefor and, as an extension, a driving path as a whole, by which the vehicle 10 has a smooth trajectory.

An example of the driving path lateral curvature determination function Q(x) is shown in Equation 3:

$$Q(x) = \sum_{\{i=1\}}^{K} \|Curv(x_i)\|^2 \quad \text{(Eq. 3)}$$

In Equation 3, $Curv(x_i)$ is the lateral curvature between the candidate future lateral positions of the vehicle 10, which is determined at the candidate future lateral positions of the vehicle 10 for given future longitudinal positions of the vehicle 10, for instance, at the discretized lateral cross sections LCS of the roadway 100.

The lane center lateral offset determination function R(x) determines the lateral offsets of the vehicle 10 from the lane center 116 of the lane 114 of the roadway 100 in which the vehicle 10 is located at the candidate future lateral positions of the vehicle 10.

In support of this determination, the perception module 92 may identify, among other features of the roadway 100, the lane 114 of the roadway 100 in which the vehicle 10 is located, as well as its lane center 116.

In the context of the energy function, the lane center lateral offset determination function R(x) favors low lateral offsets from the lane center 116 by returning lower values for the candidate future lateral positions of the vehicle 10 at which the lateral offsets from the lane center 116 are lower. Equally, the lane center lateral offset determination function R(x) penalizes high lateral offsets from the lane center 116 by returning higher values for the candidate future lateral positions of the vehicle 10 at which the lateral offsets from the lane center 116 are higher.

With the energy function, in other words, favoring low lateral offsets from the lane center 116 via the lane center lateral offset determination function R(x), the energy function favors the determination of future lateral positions of the vehicle 10 from among the candidates therefor and, as an extension, a driving path as a whole, by which the vehicle 10 stays close to the lane center 116 of the lane 114 of the roadway 100 in which the vehicle 10 is located.

An example of the lane center lateral offset determination function R(x) is shown in Equation 4:

$$R(x) = \sum_{\{i=1\}}^{K} \|y(x_i)\|^2 \quad \text{(Eq. 4)}$$

In Equation 4, $y(x_i)$ is the lateral offset of the vehicle 10 from the lane center 116 of the lane 114 of the roadway 100 in which the vehicle 10 is located, which is determined at the candidate future lateral positions of the vehicle 10 for given future longitudinal positions of the vehicle 10, for instance, at the discretized lateral cross sections LCS of the roadway 100.

The obstacle proximity determination function S(x) determines the proximity of the vehicle 10 from obstacles on the roadway 100 at the candidate future lateral positions of the vehicle 10.

In support of this determination, the perception module 92 may identify, among other objects in the environment surrounding the vehicle 10, obstacles on the roadway 100, such as the neighboring vehicle 106. In addition to the presence of the obstacles on the roadway 100, the perception module 92 may further identify their location and motion, which the planning/decision making module 94 may use to predict their future maneuvering along the roadway 100.

In the context of the energy function, the obstacle proximity determination function S(x) favors far proximity from obstacles by returning lower values for the candidate future lateral positions of the vehicle 10 at which the proximity from obstacles is far. Equally, the obstacle proximity determination function S(x) penalizes close proximity to obstacles by returning higher values for the candidate future lateral positions of the vehicle 10 at which the proximity to obstacles is close.

With the energy function, in other words, favoring far proximity from obstacles via the obstacle proximity determination function S(x), the energy function favors the determination of future lateral positions of the vehicle 10 from among the candidates therefor and, as an extension, a driving path as a whole, by which the vehicle 10 stays away from obstacles.

An example of the obstacle proximity determination function S(x) is shown in Equation 5:

$$S(x_i) = \begin{cases} \infty & dis(x_i) < \theta \\ 0 & dis(x_i) \geq \theta \end{cases} \quad \text{(Eq. 5)}$$

In Equation 5, $dis(x_i)$ is a minimum distance between the vehicle 10 and obstacles on the roadway 100, and $\theta$ is the closest distance between the vehicle 10 and obstacles on the roadway 100 without the vehicle 10 crashing into the obstacles on the roadway 100. These are determined at the candidate future lateral positions of the vehicle 10 for given future longitudinal positions of the vehicle 10, for instance, at the discretized lateral cross sections LCS of the roadway 100, based on the predicted future maneuvering of the obstacles along the roadway 100.

The predetermined driving path deviation determination function T(x) determines the deviation from a predetermined driving path along the roadway 100 at the candidate future lateral positions of the vehicle 10 across the direction of the roadway 100. The predetermined driving path may, for example, be the driving path determined in a previous iteration of the process 200.

In the context of the energy function, the predetermined driving path deviation determination function T(x) favors low deviation from the predetermined driving path by returning lower values for the candidate future lateral positions of the vehicle 10 at which the deviation from the predetermined driving path is lower. Equally, the predetermined driving path deviation determination function T(x) penalizes high deviation from the predetermined driving path by returning higher values for the candidate future lateral positions of the vehicle 10 at which the deviation from the predetermined driving path is higher.

With the energy function, in other words, favoring low deviation from the predetermined driving path via the predetermined driving path deviation determination function T(x), the energy function favors the determination of future lateral positions of the vehicle 10 from among the candidates therefor and, as an extension, a driving path as a whole, by which the vehicle 10 continues according to the predetermined driving path.

The sub-functions may be weighted to, for example, establish the extent which the energy function favors the different aspects of the candidate future lateral positions of the vehicle 10 determined by the sub-functions. In Equation 1, for instance, a weighing factor $\rho$ is applied to the vertical wheel position determination function P(x), a weighing factor $\lambda$ is applied to the driving path lateral curvature determination function Q(x), a weighing factor $\mu$ is applied to the lane center lateral offset determination function R(x), and a weighing factor $\eta$ is applied to the obstacle proximity determination function S(x).

One, some or all of the weighing factors $\rho$, $\lambda$, $\mu$ and $\eta$ may be dynamically increased or decreased compared to one, some or all of the remaining weighing factors $\rho$, $\lambda$, $\mu$ and $\eta$. This adjusts the extent which the energy function favors the different aspects of the candidate future lateral positions of the vehicle 10 determined by the sub-functions to which the weighing factors $\rho$, $\lambda$, $\mu$ and $\eta$ are applied.

These increases and decreases may be based on the information about the environment surrounding the vehicle 10 and, even more specifically, based on the identification, by the perception module 92, of roadway conditions. In one implementation, the perception module 92 may identify, among other roadway conditions, the lateral surface profile LSP of the roadway 100 and its discretized lateral cross sections LCS of the roadway 100, as well as the depths of the snow ruts 120 on the roadway 100 that they represent. In this implementation, the weighing factor $\rho$ applied to the vertical wheel position determination function P(x) may be increased compared to one, some of all of the remaining weighing factors $\lambda$, $\mu$ and $\eta$ with increasing depths of the snow ruts 120 on the roadway 100, for example. These increases increase the extent which the energy function favors low vertical wheel positions via the vertical wheel position determination function P(x) commensurate with the increasing desirability for the vehicle 10 to follow the existing tracks in the snow ruts 120, and avoid the snow piles bordering the tracks.

In operation 208, the planning/decision making module 94 generates the driving plan. The driving plan describes, among other things about maneuvering the vehicle 10 along the roadway 100, the driving path. To determine the driving path, the planning/decision making module 94 uses the energy function to determine, as part of the driving path, and based on the different aspects of the candidate future lateral positions of the vehicle 10 determined using the sub-functions in operation 206, the set, x, of the future lateral positions of the vehicle 10 from among the candidates therefore for given future longitudinal positions of the vehicle 10. The set, x, of the future lateral positions of the vehicle 10 is, more specifically, determined as the argument at which the energy function is minimized.

Figure 5:
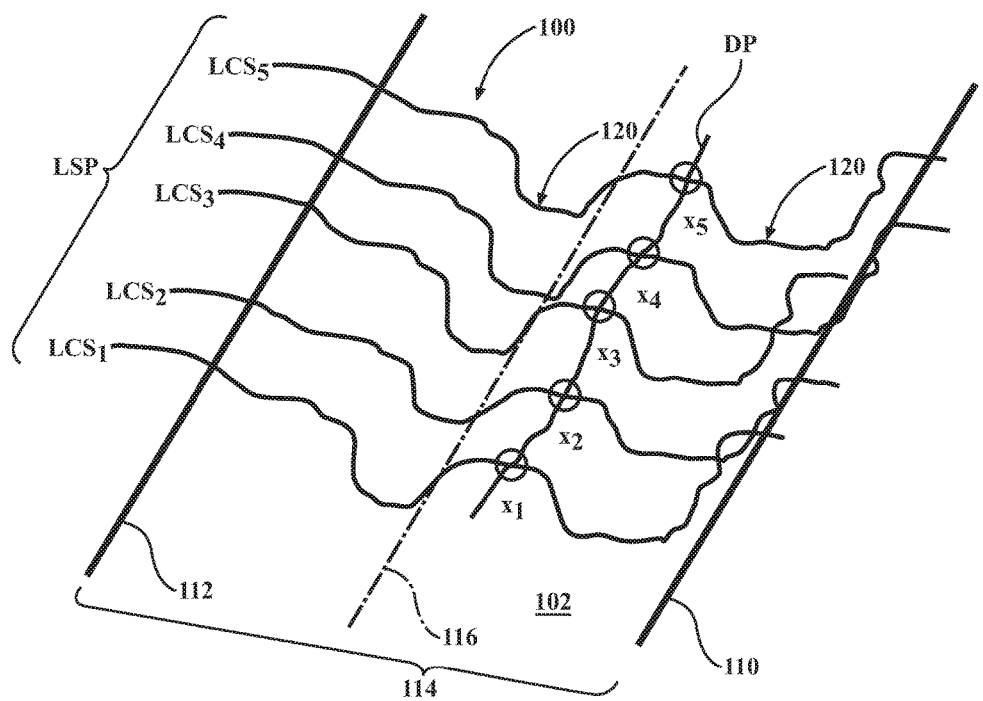

As shown with additional reference to FIG. 5, an example driving path DP is represented by the future lateral positions of the vehicle 10, $x_{1-5}$, for given future longitudinal positions of the vehicle 10 at discretized lateral cross sections $LCS_{1-5}$ of the roadway 100 representing the lateral surface profile LSP of the roadway 100. Absent the surface 102 of the roadway 100 being covered in snow, a driving path by which the vehicle 10 stays close to the lane center 116 of the lane 114 of the roadway 100 in which the vehicle 10 is located, for instance, might be desirable. With the surface 102 of the roadway 100 being covered in snow, however, this otherwise desirable driving path could destabilize the vehicle 10 by positioning its wheels 14 on the snow piles bordering the tracks in the snow ruts 120. The example driving path DP, on the other hand, is a global optimum returned from a single framework that accommodates not only low lateral offsets from the lane center 116, but also low vertical wheel positions, among other interacting aspects of the candidate future lateral positions of the vehicle 10. The example driving path DP is, accordingly, somewhat to the right of the lane center 116 of the lane 114, so that the vehicle 10 follows the existing tracks in the snow ruts 120, and avoids the snow piles bordering the tracks, while still staying as close as possible to the lane center 116 of the lane 114.

With the driving plan generated by the planning/decision making module 94, in operation 210, the control module 96 operates the appropriate vehicle systems 30 to execute the driving plan. With the execution of the driving plan, the vehicle 10 is maneuvered according to the driving plan from the origin to the ultimate future location of the vehicle 10 on the roadway 100.

In the process 200, the vehicle 10 is a host vehicle. With the vehicle 10 as the host vehicle, the generated driving plan is for maneuvering the vehicle 10 along the roadway 100, and describes the driving path of the vehicle 10 along the roadway 100. It is contemplated that a similar framework as that used to return the driving path of the vehicle 10 along the roadway 100 may also be used to return predicted driving paths along the roadway 100 for other obstacles on the roadway 100, such as the neighboring vehicle 106. These predicted driving paths for other obstacles may then be used to predict the future maneuvering of those obstacles along the roadway 100.

For instance, once again with predicted future longitudinal positions of the neighboring vehicle 106 taken as a given or otherwise determined as a matter of course, the predicted future lateral positions of the neighboring vehicle 106 from among the candidates therefor and, as an extension, the predicted driving path for the neighboring vehicle 106 as a whole, may be determined using the example energy function shown in Equation 6:

$$y = \mathrm{argmin}[\rho P(y) + \lambda Q(y) + \mu R(y) + \eta S(y) + T(y)] \quad \text{(Eq. 6)}$$

In Equation 6, the argument at which the energy function is minimized, y, is a set of the predicted future lateral positions of the neighboring vehicle 106 (i.e., $y_i$) for given predicted future longitudinal positions of the neighboring vehicle 106.

This energy function, like the energy function shown in Equation 1, includes a number of sub-functions that determine different aspects of the candidate predicted future lateral positions of the neighboring vehicle 106. The sub-functions may include, for instance, a vertical wheel position determination function P(y), a driving path lateral curvature determination function Q(y), a lane center lateral offset determination function R(y), an obstacle proximity determination function S(y) and a predetermined driving path deviation determination function T(y). The description of the energy function and its included sub-functions shown in Equation 1, as well as weighing factors applied to the sub-functions, is applicable in principle to the energy function and its included sub-functions shown in Equation 6, with the exception that, for instance, the predetermined driving path deviation determination function T(y) may use a predetermined driving path determined as a function of the tracked motion of the neighboring vehicle 106 along the roadway 100, instead of the driving path determined in a previous iteration of the process 200.

Once determined, the predicted driving path of the neighboring vehicle 106 may, for instance, be used in the obstacle proximity determination function S(x) to predict the future maneuvering of the neighboring vehicle 106 along the roadway 100. The predicted driving path for the neighboring vehicle 106 may, accordingly, be used to determine the driving path of the vehicle 10 along the roadway 100 and thus, ultimately, the driving plan for maneuvering the vehicle 10 along the roadway 100.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of autonomous driving, comprising:
    identifying, using a perception module executable by at least one processor, from detected information about an environment surrounding a vehicle on a roadway, a lateral surface profile of the roadway;
    determining, using a planning/decision making module executable by the at least one processor, based on the lateral surface profile of the roadway, vertical wheel positions at identified candidate future lateral positions of the vehicle; and
    determining, using the planning/decision making module executable by the at least one processor, as part of a driving path along the roadway, and based on the determined vertical wheel positions, future lateral positions of the vehicle from among the identified candidates therefor using an energy function that algorithmically favors low vertical wheel positions.

2. The method of claim 1, wherein the vehicle is a host vehicle, further comprising:
    operating, using a control module executable by the at least one processor, vehicle systems in the host vehicle to maneuver the host vehicle along the roadway according to a driving plan describing the driving path.

3. The method of claim 1, wherein the vehicle is a neighboring vehicle to a host vehicle, further comprising:
    predicting, using the planning/decision making module executable by the at least one processor, based on the driving path, future maneuvering of the neighboring vehicle along the roadway; and
    operating, using a control module executable by the at least one processor, vehicle systems in the host vehicle to maneuver the host vehicle along the roadway based on the predicted future maneuvering of the neighboring vehicle along the roadway.

4. The method of claim 1, further comprising:
    determining, using the planning/decision making module executable by the at least one processor, in addition to the vertical wheel positions, one or more other aspects of the identified candidate future lateral positions of the vehicle, wherein the energy function further algorithmically favors the one or more other aspects; and
    adjusting, using the planning/decision making module executable by the at least one processor, the extent which the energy function algorithmically favors low vertical wheel positions compared to the one or more other aspects based on an identified roadway condition.

5. The method of claim 4, further comprising:
    identifying, using the perception module executable by the at least one processor, as the roadway condition, the lateral surface profile of the roadway, with the lateral surface profile of the roadway representing one or more ruts on the roadway, and with the energy function increasingly algorithmically favoring low vertical wheel positions compared to the one or more other aspects with increasing depths of the one or more ruts on the roadway.

6. The method of claim 4, wherein the one or more other aspects include one or more of low lateral curvature between the identified candidate future lateral positions of the vehicle for given future longitudinal positions of the vehicle, low lateral offsets from an identified lane center of the roadway at the identified candidate future lateral positions of the vehicle, far proximity from identified obstacles on the roadway at the identified candidate future lateral positions of the vehicle, and low deviation from a predetermined driving path along the roadway at the identified candidate future lateral positions of the vehicle.

7. The method of claim 1, wherein the energy function further algorithmically favors low lateral curvature between the identified candidate future lateral positions of the vehicle for given future longitudinal positions of the vehicle.

8. The method of claim 1, further comprising:
    identifying, using the perception module executable by the at least one processor, from the detected information about the environment surrounding the vehicle, a lane center of the roadway; and
    determining, using the planning/decision making module executable by the at least one processor, lateral offsets from the identified lane center of the roadway at the identified candidate future lateral positions of the vehicle, wherein the energy function further algorithmically favors low lateral offsets from the identified lane center of the roadway.

9. The method of claim 1, further comprising:
    identifying, using the perception module executable by the at least one processor, from the detected information about the environment surrounding the vehicle, obstacles on the roadway; and
    determining, using the planning/decision making module executable by the at least one processor, proximity from the identified obstacles on the roadway at the identified candidate future lateral positions of the vehicle, wherein the energy function further algorithmically favors far proximity from the identified obstacles on the roadway.

10. The method of claim 1, wherein the energy function further algorithmically favors low deviation from a predetermined driving path along the roadway.

11. The method of claim 1, further comprising:
    detecting, using sensors, the information about the environment surrounding the vehicle.

12. A vehicle, comprising:
- sensors configured to detect information about an environment surrounding the vehicle;
- vehicle systems operable to maneuver the vehicle; and
- one or more modules stored on memory and executable by at least one processor for initiating instructions, the instructions including:
  - identifying, from the detected information about the environment surrounding the vehicle, a lateral surface profile of the roadway;
  - determining, based on the lateral surface profile of the roadway, vertical wheel positions at identified candidate future lateral positions of the vehicle;
  - determining, as part of a driving path along the roadway, and based on the determined vertical wheel positions, future lateral positions of the vehicle from among the identified candidates therefor using an energy function that algorithmically favors low vertical wheel positions; and
  - operating the vehicle systems to maneuver the vehicle along the roadway according to a driving plan describing the driving path.

13. The vehicle of claim 12, wherein the instructions further include:
- determining, in addition to the vertical wheel positions, one or more other aspects of the identified candidate future lateral positions of the vehicle, wherein the energy function further algorithmically favors the one or more other aspects; and
- adjusting the extent which the energy function algorithmically favors low vertical wheel positions compared to the one or more other aspects based on an identified roadway condition.

14. The vehicle of claim 13, wherein the instructions further include:
- identifying, as the roadway condition, the lateral surface profile of the roadway, with the lateral surface profile of the roadway representing one or more ruts on the roadway, and with the energy function increasingly algorithmically favoring low vertical wheel positions compared to the one or more other aspects with increasing depths of the one or more ruts on the roadway.

15. The vehicle of claim 13, wherein the one or more other aspects include one or more of low lateral curvature between the identified candidate future lateral positions of the vehicle for given future longitudinal positions of the vehicle, low lateral offsets from an identified lane center of the roadway at the identified candidate future lateral positions of the vehicle, far proximity from identified obstacles on the roadway at the identified candidate future lateral positions of the vehicle, and low deviation from a predetermined driving path along the roadway at the identified candidate future lateral positions of the vehicle.

16. The vehicle of claim 12, wherein the energy function further algorithmically favors low lateral curvature between the identified candidate future lateral positions of the vehicle for given future longitudinal positions of the vehicle.

17. The vehicle of claim 12, wherein the instructions further include:
- identifying, from the detected information about the environment surrounding the vehicle, a lane center of the roadway.

18. The vehicle of claim 17, wherein the instructions further include:
- determining lateral offsets from the identified lane center of the roadway at the identified candidate future lateral positions of the vehicle, wherein the energy function further algorithmically favors low lateral offsets from the identified lane center of the roadway.

19. The vehicle of claim 12, wherein the instructions further include:
- identifying, from the detected information about the environment surrounding the vehicle, obstacles on the roadway; and
- determining proximity from the identified obstacles on the roadway at the identified candidate future lateral positions of the vehicle, wherein the energy function further algorithmically favors far proximity from the identified obstacles on the roadway.

20. The vehicle of claim 12, wherein the energy function further algorithmically favors low deviation from a predetermined driving path along the roadway.

* * * * *